US006997981B1

(12) United States Patent
Coombs et al.

(10) Patent No.: US 6,997,981 B1
(45) Date of Patent: Feb. 14, 2006

(54) THERMAL CONTROL INTERFACE COATINGS AND PIGMENTS

(75) Inventors: Paul G. Coombs, Santa Rosa, CA (US); Charles T. Markantes, Santa Rosa, CA (US); Roger W. Phillips, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 229 days.

(21) Appl. No.: 10/152,593

(22) Filed: May 20, 2002

(51) Int. Cl.
B32B 5/16 (2006.01)

(52) U.S. Cl. .................. 106/415; 106/416; 106/417; 428/403; 428/404

(58) Field of Classification Search ........ 106/415–417; 428/403–404
See application file for complete search history.

(56) References Cited

U.S. PATENT DOCUMENTS

| | | | |
|---|---|---|---|
| 3,438,796 A | 4/1969 | Hanke ................... 106/291 |
| 4,011,190 A | 3/1977 | Telkes ................... 260/33.65 |
| 4,311,623 A | 1/1982 | Supcoe .................. 260/18 |
| 4,320,155 A | 3/1982 | Gillery .................. 427/160 |
| 4,565,719 A | 1/1986 | Phillips et al. ............. 428/34 |
| 4,578,527 A | 3/1986 | Rancourt et al. ........... 136/256 |
| 5,005,719 A | 4/1991 | Phillips et al. ............ 215/230 |
| 5,135,812 A | 8/1992 | Phillips et al. ............ 428/403 |
| 5,214,530 A | 5/1993 | Coombs et al. ............ 359/359 |
| 5,281,480 A | 1/1994 | Phillips et al. ............ 428/412 |
| 5,424,119 A | 6/1995 | Phillips et al. ............ 428/328 |
| 5,569,535 A | 10/1996 | Phillips et al. ............ 428/403 |
| 5,814,367 A | 9/1998 | Hubbard et al. ........... 427/162 |
| 5,989,626 A | 11/1999 | Coombs et al. ............ 427/162 |
| 6,013,370 A | 1/2000 | Coulter et al. ............ 428/403 |
| 6,150,022 A | 11/2000 | Coulter et al. ............ 428/403 |
| 6,235,105 B1 | 5/2001 | Hubbard et al. ............ 106/415 |
| 6,325,847 B1 * | 12/2001 | Christie et al. ............ 106/417 |
| 6,440,208 B1 * | 8/2002 | Christie et al. ............ 106/415 |
| 6,586,098 B1 * | 7/2003 | Coulter et al. ............ 428/403 |

OTHER PUBLICATIONS

Goddard Space Flight Center, National Technical Information Service Publication #N74-10545.

* cited by examiner

Primary Examiner—J. A. Lorengo
Assistant Examiner—S. S. Manlove
(74) Attorney, Agent, or Firm—Allen, Dyer, Doppelt, Milbrath & Gilchrist, P.A.

(57) ABSTRACT

The invention provides an optical structure with low chroma and brightness in the visible region and low emissivity in the infrared region. The optical structure includes an interference structure having an infrared reflective layer and an infrared absorbing thin film layer. These layers are in turn separated by a thin film spacer of a dielectric or semiconductor material. The reflectivity and transmission of the layers are selectively controlled through the thickness of the layers such that the visual reflectivity and color is independent of the infrared properties of the absorber and reflector layers.

6 Claims, 8 Drawing Sheets

THERMAL CONTROL INTERFACE COATINGS AND PIGMENTS

CROSS REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING

Not applicable

BACKGROUND OF THE INVENTION

This invention relates to partially reflective coatings useful for controlling thermal radiation, that is infrared reflective coatings that that have selectively controlled optical properties in visual wavelengths permitting a wide variation in perceived color and brightness having optimal infrared optical properties.

Various methods have been used to achieve thermal radiation control of objects by selectively controlling the object's reflectivity to infrared radiation. Methods generally involve either applying a coating to an object or forming its outer surface of a material having high infrared reflectivity. Thermal radiation controlled objects and surfaces have a number of uses, among which are solar collector absorber panels, space vehicle surfaces, and camouflaging military vehicles from detection by infrared scanning. In many cases, it is desirable to selectively reflect specific wavelengths of the infrared radiation while attenuating others by absorption. For example, for solar energy collection it is desirable that the surface coating absorb radiation corresponding to the sun's solar emission spectrum, that is principally from 300 to 2,500 nanometers, while having a higher reflectivity at longer (generally above about 4 microns) "thermal" wavelengths. This allows the object to absorb and retain the sun's heat because the increased reflectivity at the thermal wavelengths decreases emittance of these wavelengths. The temperature of the object generally determines the wavelength of the thermal emissions. For an object in thermal equilibrium with its surroundings having a given temperature, the term emmitance is defined at the ratio of the energy emitted by such object divided by the energy that would be emitted by a perfect black body at the same temperature. For an object at room temperature (27 degrees Celsius, 300 degrees Kelvin), emittance can be written as:

$$\varepsilon_{300K} = \frac{\int_4^{40} (1 - R(\lambda) - T(\lambda)) BB(\lambda, 300K) d\lambda}{\int_4^{40} BB(\lambda, 300K) d\lambda}$$

where $R(\lambda)$ and $T(\lambda)$ are the reflectance and transmittance of the object at each wavelength, respectively, $BB(\lambda, 300K)$ is shorthand for the so-called black-body function predicting the amount of energy emitted by a 300°K perfect black body at each wavelength, and the limits of integration are 4 micrometers to 40 micrometers. For an opaque object, the transmittance is zero and hence the higher the IR reflectance of the object, the lower the IR emittance. Conversely, for opaque objects, the lower the IR reflectance of the object, the higher the IR emittance.

Differential absorption and reflectivity of solar and thermal wavelengths, can be achieved by first metallizing a surface with highly polished or reflective metal foils or coatings, as many metals are highly reflective in the solar and far-infrared (thermal) regions of the spectrum. Selective absorption in the solar wavelengths can be achieved by over coating the reflective metallic surface with materials that selectively absorb solar wavelengths. The most common methods for forming such surfaces are by electrochemical deposition techniques followed by chemical oxidation of the deposit and by "paint" technology using organic based coatings.

In the former case, a suitable substrate, such as aluminum, is electroplated with copper. The copper surface is then chemically oxidized to form a surface layer of cupric oxide. One objection to this method is the high cost of the combined electrochemical/chemical oxidation process to obtain the desired surface. Another disadvantage is that one cannot select the visible color or appearance of the composite structure, which is the color of cupric oxide.

Paint technology has been used to give objects selective radiation properties. Some paints use organic solvents and organic binders with an additive. A particular example is a lead sulfide/silicone resin binder in xylene. However, organic-based paints typically release volatile organic compounds, which may be controlled or even prohibited in some areas because of environmental concerns. Further, such organic paints may not provide sufficient radiation control properties for some applications.

Water-based paints have also been investigated. Black silicate paint has been developed that uses a suitable pigment bound in an alkali metal silicate, such as sodium silicate. Such a formulation is sprayable and achieves an effect similar to that of the electrochemical process or by organic binder paint technology. Unfortunately, the pigments can react chemically with the silicate binders in some instances to form pigment silicate salts or complexes. These compounds alter the properties of absorptance and emittance of the coating to such an extent that the performance of the coating may degrade to an unacceptable level.

Another approach is to use two water-based coatings in which a layer of a semiconductor pigment is first deposited upon a thermally reflective substrate and then this pigment layer is overcoated with an alkali metal silicate binder. The silicate layer is heat cured at above ambient temperatures to form a protective coating over the pigment.

The technology of thermal radiation control surfaces is based on the need to obtain a surface that absorbs radiation in the range of 300 to 2,500 nanometers while at the same time suppressing emission of thermal energy. This basic principle accounts for the operation of solar collector absorber panels, infrared transparent coatings used on military equipment and the like. The general approach is to start with a substrate material that has high reflectance (low absorbance) over the entire spectral range including the incident radiation and potential emission (300 to 40,000 nanometers, for example). Examples of such useful substrates include metals such as aluminum, copper, steel and the like, and non-metallic substrates, such as plastics and glass, which can be metallized to provide a highly reflective surface.

In order to obtain the desired properties of opaqueness to ultraviolet and visible light and transparency to infrared radiation, it is desirable to form a coating on the highly reflective substrate that absorbs in the visible and ultraviolet region while transmitting infrared. The combination of the coating on the substrate is preferably highly absorbing in the visible range and highly reflecting (low emitting) in the thermal range. This makes semiconductor pigments highly desirable, as these compounds are highly transparent in the infrared, but absorb in the visible region. Not all semiconductor pigments are useful, as those having a high refractive index and thus a high surface reflection coefficient give rise to unacceptable reflection losses. Thus, only those semiconductor pigments having low enough refractive indices to keep surface reflectivity at a minimum are acceptable. Among such useful semiconductor pigments are copper oxide, iron oxides, both naturally-occurring and synthetically made, chromium oxides, nickel oxide, complexes of nickel-zinc-sulfide, lead sulfide and so forth. Since thermal and photochemical stability is required of the semiconductor, organic dyes would not be very useful and the preferred semiconductors are, therefore, the inorganic pigments already enumerated.

Such thermal control surfaces have undesirable visual appearances for many applications because the broadband reflectors are very bright or metallic in appearance, while selective absorbers have a black appearance in the visible.

One approach uses a paint composition to achieve a diffused visual blue-gray coating of non-metallic texture for use on metal surfaces that provides reduced infrared emittance. Previous camouflage coatings and paints used on hulls of naval vessels often exhibited relatively high solar absorption because of the dark colors and diffused finishes that are characteristic of the coatings. This high solar absorption resulted in high surface temperatures that increase cooling requirements and more importantly increased infrared radiation. In modern warfare, infrared detection techniques have become highly developed and means for counter-detection techniques are accordingly required. Artificial cooling of hot exposed surfaces is effective to reduce infrared emission. However, this method increases electrical power requirements aboard ship as well as adding parasitic weight and volume to equipment aboard the ship.

This low infrared emittance coating is applied as a paint to provide a durable opaque coating suitable for use on exposed surfaces of naval vessels or on hot surfaces of a gas turbine exhaust. Ideally, such coated surfaces exhibit low reflectance in the visual portion of the light wavelengths and high reflectance in the infrared portion. The paint is a mixture of colorant and emitance control pigments such as aluminum, zinc sulfide, antimony trisulfide, and blue pigments; aluminum oxide filler; silicon alkyd resin binder; polarized montmorillite clay; and a diluent. Like traditional military paints, it utilizes some fraction of visually absorptive pigments, that do not have wavelength specific or optimized infrared properties; their reflectance tends to be constant over different wavelength bands, which compromises its infrared performance.

Various flakes or pigments have been made that have optically selective or optically variable properties. Some optically selective pigments have interference structures that enhance or suppress a portion of the visible spectrum to achieve a desired color, and are generally used in colorful paints, inks, plastics, and other carriers. Some optically variable pigments are similarly directed at the visible spectrum and shift color as the location of the observer changes. The interference structures typically include thin film layers of spacer (dielectric) and absorber materials over a reflector. Similar flakes utilize optical coating structures to selectively absorb solar radiation in paint intended for passive solar energy systems; however, the thermal emittance characteristics of the paint appears to be influenced by the infrared absorption spectra of the paint vehicle.

Prior technology for thermal control of visually opaque objects resulted in either a highly reflective metallic appearance, in the case of broadband visual IR reflectors, or a black color, in that materials selectively absorbing in the solar IR region are also absorbing in visual wavelengths. Other attempts at reducing the chroma of coatings often include adding a darkening agent to the carrier or binder. This often detracts from the IR performance of the coating. Attempts to achieve other visual colors resulted in some compromise of the thermal control properties.

Accordingly, it would be desirable to provide flake-like pigments that have low reflection in visible light in a range of colors, with selectable visible color characteristics being independent from their IR characteristics.

Another object of the present invention is to provide thermal control of visually opaque objects, especially those having arbitrary or irregular shape by application of a coating or foil that allows selective absorption of light at visible wavelengths, and reflection of light at IR wavelengths. It is further desirable that thermal control coatings have a range of independently selected color and chroma in the visible wavelengths.

Another objective of the present invention to provide efficient solar energy collection absorbing material with low thermal emittance, and that solar energy collection absorbing material be available in a selection of colors.

BRIEF SUMMARY OF THE INVENTION

The present invention provides optical interference structures that appear dark or have low chroma in the visible portion of the spectrum and relatively high reflectivity in the infrared portion of the spectrum. In one embodiment the optical interference structure includes a reflector, spacer layer, and absorber layer. The absorber layer has a thickness that provides a transmittance of between about 5–85%. In other embodiments the thickness of the absorber layer and spacer layer are selected according to the reflectivity of the reflective layer. In some embodiments, the optical interference structures have a chroma of less than 50 and a reflectivity in the infra-red portion of the spectrum of more than 50%, and in some cases greater than 80%.

In some embodiments the optical interference structures are used in pigments, such as by forming the optical interference structure on one or both sides of a pigment flake, or forming the structures on a roll of polymer film, and then separating and processing the deposited film structure into pigment flakes. In other embodiments, the optical interference structures are deposited onto a substrate, such as a sheet of foil, that is than attached to an object, or directly onto an object, such as a panel. The foil or object can be reflective and serve as the reflector in the resulting interference structure.

DETAILED DESCRIPTION OF THE INVENTION

The present invention relates to optical thin film structures that provide low perceived color and relatively high IR reflectivity. Embodiments of the invention may be embodied as pigment flakes for use in paints, inks, plastic sheets (films), plastic objects, and powder coatings, as foils that are attached to objects, or coatings that are formed directly on objects. In some embodiments, the optical thin film structures appear very dark or even black. Objects coated with pigments, foils, or coatings according to these embodiments of the invention have low perceived color because of the low lightness, even though the measured chroma may be fairly high. In other embodiments, a pigment, foil, or coating appears gray, which may have high lightness in combination with relatively low chroma. In yet other embodiments, the optical thin film structures can be selected to provide a low level of color. Typically, such optical thin film structures exhibit little goniometric color shifting, unlike what are commonly known as optically variable pigments.

Table 1 briefly outlines some of the various embodiments of the present invention. The average reflectance from 400–700 nm is basically a measure of the lightness (L*) in the visible region. The average reflectance between 4–40 micrometers is basically an indication of the IR reflectance, and the chroma (C*$_{ab}$ according to CIE™ colormetric conventions) is basically an indication of the visible color characteristic of the surface or object. A high IR reflectance is desirable to reduce IR emissivity, such as for solar energy collectors or IR camouflage.

TABLE 1

Comparison of Optical Attributes Between Some Embodiments of the Present Invention

| Appearance | Ave. Reflectance 400–700 nm | Ave. Reflectance 4–40 microns | Chroma (C*$_{ab}$) |
|---|---|---|---|
| Black | <20% | >50% | up to 50 |
| Gray | <50% | >50% | <5 |
| Low Color | <50% | >50% | <20 |

Other types of pigments are designed to provide high chroma and a high degree of optical variance, i.e. color change, with viewing angle. However, in certain embodiments of the invention a relatively neutral color of the pigment flakes arises from a substantially constant reflectivity as a function of wavelength within the visible spectral region. A change in viewing angle does not produce a significant color change because the spectral response remains relatively flat at shorter wavelengths.

Black, gray, and low-color optical thin film structures according to some embodiments of the present invention are relatively thin, compared to multi-layer high-chroma optical thin-film stacks, for example. When depositing thin designs (e.g. optical thin film stacks having a total thickness less than 250 nm) onto flakes, it may be desirable to provide a stiffening layer(s) or to form the optical design on stiff flakes, such as glass flakes, which are discussed in further detail below.

Figure 1A:
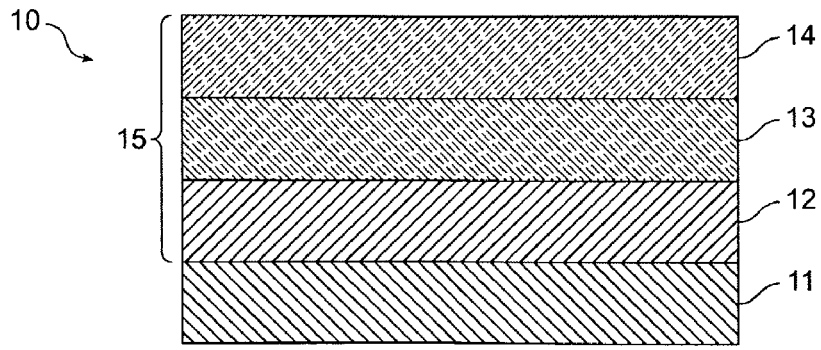
FIG. 1A is a simplified cross section diagram of a multi-layer interference structure according to an embodiment of the present invention.

I. General Description of Optical Thin Film Structures According to Embodiments of the Present Invention FIG. 1A is a simplified cross section of a multi-layer interference structure 10 according to an embodiment of the present invention. The structure includes an optical thin film stack 15 deposited on a substrate 11. The substrate could be a flake, such as a glass or metal flake, a foil or film, or an object, such as a structural panel. Only one side of the substrate is shown with an optical thin film stack, but the opposing side of the substrate could also have an optical stack, being the same as or different from the one illustrated. Flakes are often coated symmetrically on both sides, as further discussed in relation to FIGS. 2A and 2B, below.

The first layer 12 of optical stack 15 is reflective in at least the infrared wavelength range of interest. A spacer layer 13 overlies the IR-reflective layer 12. The spacer layer can be either a dielectric or semiconductor material, but in this embodiment is a dielectric material. A layer of absorber material 14 is coated onto the spacer layer 13. The spacer and absorber layers are in optical communication with each other and the underlying reflective layer in the sense that they form an optical interference coating in which the incident light is selectively attenuated by destructive interference and/or induced absorption. It will be recognized by those skilled in the art of optical coating design that a single layer can be replaced by a plurality of multiple layers without substantially affecting the function, that is the optical communication of the aforementioned layers as set forth above. Similarly, the substrate itself may be reflecting and act as a reflector. In that case the separate reflective layer might then be omitted. Thus, the recitation of a single layer in optical communication with adjacent layers is intended to encompass such replacements and substitutions.

The optical stack 15 may comprise additional layers of dielectric-absorber (D-A) layer pairs. The D-A layer pairs may comprise the same sets of materials or different materials; for example layer sequence $R/D_1/A_1/D_2/A_2$, where R is the reflector layer and the subscripts 1 and 2 denote different materials in the classes of spacers and absorbers. The stack can have other structures, for example a layer sequence $R/D_1/A_1/D_2$ in which the absorber layer is overcoated or in optical communication with a second dielectric layer $D_2$. When the thickness of $D_2$ is less than about 8 times that of layer $D_1$, layer $D_2$ affects and can enhance the performance of the optical stack 15, and act as an anti-reflective coating in some instances. At thicknesses above about 8 times layer $D_1$, layer $D_2$ is used primarily as a protective overcoat.

The thickness of the overcoat may be selected according to the intended application. For example, if the optical thin film structure is formed on a pigment flake, the overcoat might be relatively thick for use in a paint formulation, and relatively thin for use in an extruded plastic sheet. The thickness of the overcoat may be selected according to the improved rigidity it provides so that the pigment flakes can withstand high-stress processes, and/or according to the desired protection from the environment. A flake intended for use in a carrier that provides a high degree of protection from the environment, or for use in a relatively benign environment, might have a thinner overcoat or no overcoat, while a flake intended for use in a harsh environment might have a more substantial overcoat.

The design of the optical stack, which is primarily the thicknesses and compositions of the reflector, dielectric and absorber layers, can be varied according to the teachings of the invention to selectively control the visible color and the infrared properties. The thickness of these layers may be characterized by a physical thickness, t, in for example micrometers, or by the quarterwave optical thickness ("QWOT") with respect to light of a particular wavelength, λ, wherein n is the refractive index of the layer at designated wavelength:

$$QWOT = t/4 \times n(\lambda) \tag{Eq. 1}$$

While the optimized thickness of these layers will depend on their optical properties, such as refractive index and extinction coefficient at visible and infrared wavelengths, the thickness of the absorber material is generally selected to control the visible reflectivity of the stack based on the desired visible and infrared performance. As the thickness ($t_a$) of the absorber material increases from zero thickness, the optical stack reflectivity decreases from a value characteristic of the reflective layer, $R_r(\lambda_{VIS})$ to a minimum value. This reflectance drop is due to increasing levels of destructive interference between light beams leaving the reflector layer and those leaving the partially-reflecting absorber layer. Further increases in absorber thickness cause the device's visible reflectance to increase from the minimum value to a higher value consistent with the inherent reflectivity of the absorber material. In some embodiments, the substrate can be reflective, and the separate reflective layer can be omitted. Similarly, in some embodiments the reflective minimum lies outside the visible range, such as at 850 nm in the near IR or at 300 nm in the near ultraviolet ("UV"). These wavelengths are merely exemplary.

Figure 1B:
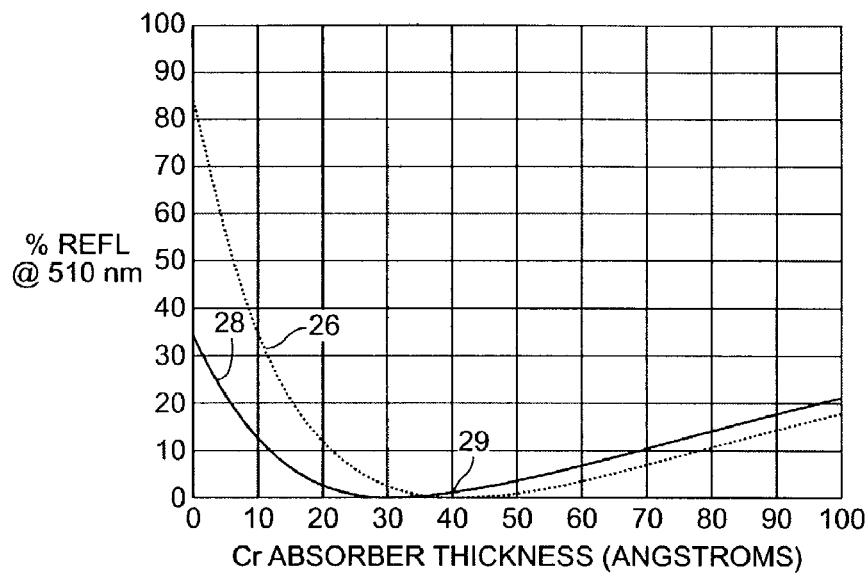
FIG. 1B shows the calculated performance of two different structures as a function of absorber thickness.
Figure 1C:
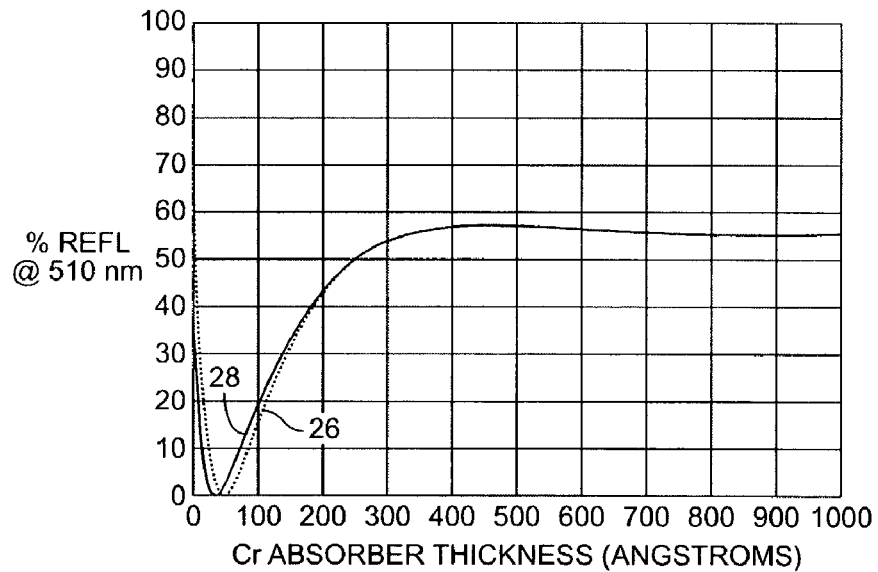
FIG. 1C shows the calculated performance of two different structures as a function of absorber thickness.

FIGS. 1B and 1C illustrate the calculated performance of different structures as a function of absorber thickness for an optical stack using an aluminum reflector, which is relatively bright, and an optical stack using a chromium reflector, which is not as reflective as aluminum. The curve 26 shown as a dotted line represents the predicted reflectance at 510 nm of an aluminum reflector with one quarter-wave (at 470 nm) thickness of magnesium fluoride, and a chromium absorber. The curve 28 shown as a solid line represents the predicted reflectance at 510 nm of a chromium reflector with one quarter-wave (at 460 nm) thickness of magnesium fluoride, and a chromium absorber. The spacer thickness may be greater or less than the examples, and a change in the spacer thickness sometimes results in an adjustment to the thickness of the absorber layer to achieve minimum reflectance in the visible spectrum.

FIG. 1C illustrates that as the absorber layer gets thicker, the reflectivity of the stacks rises from the minimum until it reaches the reflectivity of the absorber material itself. Stated differently, devices with infinitely thick absorbers no longer act as interference devices but instead have the appearance and performance of the absorber material across both the visible and infrared portions of the spectrum. Although a reflectivity minimum of about zero is attained with each stack, the optimum value of the absorber layer thickness for an optical stack using a relatively dark reflector is less than the optimum absorber thickness for an optical stack with a brighter reflector. Similarly, the optimum thickness of the spacer layer used with the darker reflector also decreased slightly.

The absorber thickness depends upon the desired levels of visible reflectance and infrared reflectance. For the device to have a dark appearance and a high far-infrared reflectance, the thickness of the absorber should provide the minimum or near-minimum reflectance in the visible region. This value will be called $tabs_{min}$ (see FIG. 1B, ref. num. 29) for the optical stack with the aluminum reflector. When an infrared reflectance more like the opaque absorber material (generally lower) is desired, the thickness of the absorber should be greater than $tabs_{min}$. Conversely, when the visible reflectance of the device is desired to be closer to that of the bare reflector, the thickness of the absorber should be less than $tabs_{min}$. In the range of about $0-3 \times tabs_{min}$ the visible performance of the device can be selected without significantly degrading the far-infrared thermal performance of the device. The optimal absorber thickness for other optical stacks may be different depending on the type of reflector and spacer thickness.

The materials for the reflector layers are selected to have the reflective characteristics suitable for the intended use of the foil or pigment. A preferred reflector material is aluminum, which has good reflectance characteristics, inexpensive, and is easy to form into a thin layer. It will be appreciated in view of the teachings herein, however, that other reflective materials may be used in place of aluminum, such as silver, iron, tantalum, iridium, rhenium, copper, silver, gold, platinum, palladium, nickel, cobalt, niobium, chromium, tin, and combinations or alloys of these or other metals or other materials that reflect in the infrared spectrum of interest. Other useful reflective materials include, but are not limited to, the transition and lanthanide metals and combinations thereof; as well as metal carbides, metal oxides, metal nitrides, metal sulfides, combinations thereof, or mixtures of metals and one or more of these materials. Accordingly, specific examples of suitable IR reflecting materials include indium oxide, indium tin oxide (ITO), europium oxide ($Eu_2O_3$), vanadium pentoxide ($V_2O_5$), rhenium oxide (ReO$_3$), lanthanum boride (LaB$_6$), combinations thereof, and the like. The thickness of the reflective layer is selected so that it is at least semi-reflective, but preferably opaque at infrared wavelengths. The reflectivity of the reflective layer is preferably greater than 50% over the wavelength range of 4 to 40 micrometers, and the thickness of the reflective layer can be increased to improve the stiffness of pigment particles or improve handling.

The spacer layers 23a and 23b are typically made of materials having indices of refraction in the range from about 1.2–4.5. The spacer layers can be composed of various materials such as those having a "high" refractive index, i.e. greater than about 1.65. Nonlimiting examples of suitable high index materials include zinc sulfide (ZnS), zinc oxide (ZnO), zirconium oxide (ZrO$_2$), titanium dioxide (TiO$_2$), diamond-like carbon, indium oxide (In$_2$O$_3$), indium-tin-oxide ("ITO"), tantalum pentoxide (Ta2O5), ceric oxide (CeO$_2$), yttrium oxide (Y$_2$O$_3$), europium oxide (Eu$_2$O$_3$), iron oxides such as (II)diiron(III) oxide (Fe$_3$O$_4$) and ferric oxide (Fe$_2$O$_3$), hafnium nitride (HfN), hafnium carbide (HfC), hafnium oxide (HfO$_2$), lanthanum oxide (La$_2$O$_3$), magnesium oxide (MgO), neodymium oxide (Nd$_2$O$_3$), praseodymium oxide (Pr$_6$O$_{11}$), samarium oxide (Sm$_2$O$_3$), antimony trioxide (Sb$_2$O$_3$), silicon (Si), silicon monoxide (SiO), germanium (Ge), selenium trioxide (Se$_2$O$_3$), tin oxide (SnO$_2$), tungsten trioxide (WO$_3$), combinations thereof, and the like. Other suitable high index materials include mixed oxides. When used as spacer layers, materials are most commonly oxidized to their stoichiometric state, such as ZrTiO$_4$, but may be sub- or super-oxidized. Non-limiting examples of such mixed oxides include zirconium titanium oxide and niobium titanium oxide.

Some spacer materials exhibit absorption in the far infrared. Because the spacer layers are relatively thin, generally only one or two quarter-waves in optical thickness in the visible spectrum, inclusion of spacer layers with IR absorbing material does not unduly affect the IR emittance of devices.

Spacer layers can be either selective or non-selective in the visible region. When selectively absorbing in the visible, the spacer works together with the absorber layer via optical interference to modify the reflected color, generally attenuating the reflection over the wavelengths where the spacer absorbs. This combinatory effect provides color shades that are not otherwise available with optical interference structures having non-selective spacer layers. At the same time, the structures can provide high infrared reflectance. Examples of selectively absorbing spacer materials include iron oxide, tungsten oxide, copper oxide, and cobalt oxide.

The spacer layers can each be composed of the same material or different materials, and can have the same or different optical or physical thickness for each layer. It will be appreciated that when the spacer layers are composed of different materials or have different thicknesses the pigment flakes exhibit different colors on each side, and the resulting mix of flakes in a pigment or paint mixture would show a new color that is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

When a high level of visible absorption (dark appearance) is desired, the spacer layer preferably has an optical thickness of about 1.0 QWOT at 200 nm to about 2.0 QWOT at 500 nm, and most preferably about 1.0 QWOT at 300 nm to about 1.0 QWOT at 700 nm. For maximum solar absorbance, the refractive index of the spacer layer is more preferably less than 2.0, most preferably less than about 1.65. Use of a low index dielectric material broadens the wavelength region of low reflectance, thus increasing the level of solar absorption. Examples of low-index materials include silicon dioxide (SiO$_2$), aluminum oxide (Al$_2$O$_3$), metal fluorides such as magnesium fluoride (MgF$_2$), aluminum fluoride (AlF$_3$), cerium fluoride (CeF$_3$), lanthanum fluoride (LaF$_3$), sodium aluminum fluorides (e.g., Na$_3$AlF$_6$ or Na$_5$Al$_3$F$_{14}$), neodymium fluoride (NdF$_3$), samarium fluoride (SmF$_3$), barium fluoride (BaF$_2$), calcium fluoride (CaF$_2$), lithium fluoride (LiF), combinations thereof, or any other low index material, i.e. a material having an index of refraction of about 1.65 or less. For example, organic monomers and polymers can be utilized as low index materials, including dienes or alkenes such as acrylates (e.g., methacrylate), perfluoroalkenes, polytetrafluoroethylene (e.g. TEFLON®), fluorinated ethylene propylene ("FEP"), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon:oxygen ratios, respectively, but the actual silicon:oxygen ratio of a particular dielectric coating layer varies somewhat from these nominal values. Such non-stoichiometric dielectric materials are also within the scope of the present invention.

Suitable materials for the absorber layer include metals, alloys, and compounds that can be reliably deposited at a thickness at which they are semi-transparent at visible wavelengths. The semi-transparent layer may have either uniform absorption, i.e. neutral density, or selective absorption across the wavelengths of the visible spectrum, or selective absorption between the visible and IR regions, depending on the desired coloration and the color of the native reflector layer. It should be understood that the absorber coating at this thickness does not need to be continuous to still work as an optical absorber. For example, a plurality of islands or dots of absorber material can suffice as an absorber. Examples of suitable metals include chromium, nickel, iron, titanium, aluminum, tungsten, molybdenum, niobium, combinations, compounds or alloys thereof, such as INCONEL™ (Ni—Cr—Fe), metals mixed in a dielectric matrix, or other substances that are capable of acting as a uniform or selective absorber in the visible spectrum. Alternatively, the absorber can also be a dielectric material such as an iron oxide (e.g., Fe$_2$O$_3$), silicon monoxide (SiO), chromium oxide (Cr$_2$O$_3$), carbon, titanium nitride (TiN), titanium sub-oxide (TiO$_x$ where x is less than 2.0), combinations thereof, and the like.

Figure 2A:
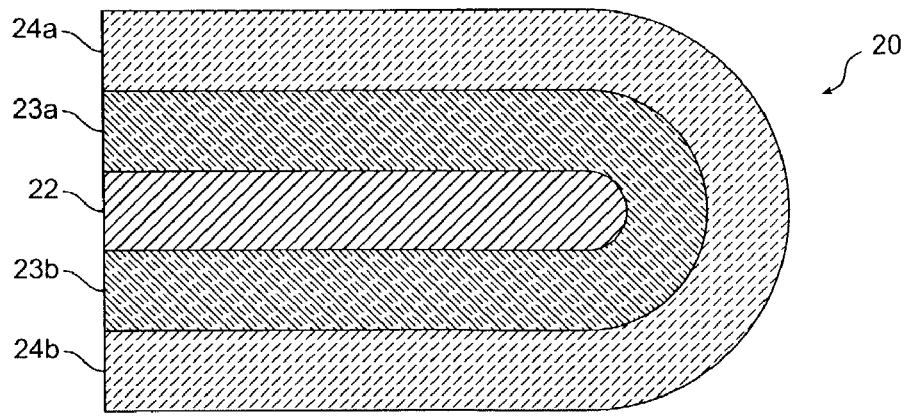
FIG. 2A is a simplified cross section diagram of a portion of a pigment flake according to an embodiment of the present invention.

FIG. 2A is a simplified cross section of a pigment particle 20 with a symmetrical multi-layer interference structure according to another embodiment of the present invention. The spacer layers 23a, 23b, and absorber layers 24a, 24b, are symmetrical about the reflector 22. The diameter of the pigment particle (parallel to the plane of the layers) is typically about 5 microns to about 100 microns, but preferably from about 10 microns to about 40 microns, and may be any of a variety of shapes, including irregular shapes. Although the particle is shown as an essentially planar stack, flat layers are not required. In some instances, the particle can take on an irregular shape, either as seen in a plan view, or cross section. In a particular embodiment, the particle is shaped similarly to a lima bean. The deposited layers are generally locally parallel to the surface on which they are deposited. Some techniques of layer formation on flakes, such as sol-gel techniques, tend to create rounded particles.

The pigment particle 20 has a central reflective layer 22. The reflective layer has dielectric or other spacer layers 23a and 23b on each major surface, with absorber layers 24a and 24b deposited on the spacer layers. Pigment particles according to embodiments of the present invention may include additional layers of dielectric-absorber pairs. For example, layer sequence $A_2/D_2/A_1/D_1/R/D_1/A_1/D_2/A_2$ uses two dielectric-absorber pairs $D_1$-$A_1$ and $D_2$-$A_2$. The D-A layer pairs may have the same materials or different materials on each side of the reflective layer. One side of the pigment particle might have a different number of layers than the other, for example $A_1/D_1/R/D_1/A_1/D_2/A_2$. Similarly, the layers may be of different materials, such as $A_1/D_1/R/D_2/A_2$ or $A_1/D_1/R/D_1/A_2$, etc., or corresponding layers on opposite sides of the reflective layer might be of different thicknesses. The pigment particle 20 may have other structures, for example layer sequence $D_2/A_1/D_1/R/D_1/A_1/D_2$ in which the absorber layers 24a and 24b would be overcoated with additional dielectric layers (not shown). In some instances, it may be desirable to overcoat an optical stack with a dielectric layer that does not significantly alter the optical properties of the stack, but provides environmental protection to the stack.

When the thickness of such an overcoat dielectric layer is less than about 8 times that of layer of the first dielectric layer 23a, the overcoat dielectric layer affects and can enhance the performance of the pigment particle, in some cases acting as anti-reflective layer. At thicknesses above about 8 times the thickness of the first dielectric layer, the overcoat dielectric layer is used primarily as a protective overcoat.

Figure 2B:
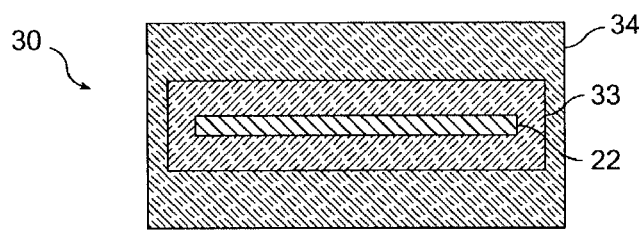
FIG. 2B is a simplified cross section diagram of a pigment flake according to an embodiment of the present invention.

FIG. 2B is a simplified cross section of a pigment flake 21 according to an embodiment of the present invention showing the central reflective layer 22 surrounded by a spacer layer 33 and an absorber layer 34. The central reflective layer could be a rigid flake with a reflective thin film layer deposited on both sides, or a metal flake, for example.

Figure 2C:
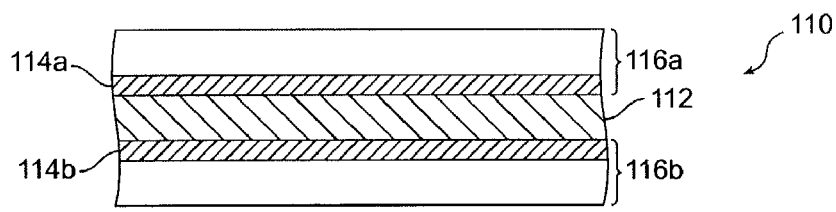
FIG. 2C is a simplified cross section of a pigment flake according to another embodiment of the present invention.

FIG. 2C is a simplified cross section of a pigment particle 110 according to another embodiment of the present invention. The pigment particle has improved rigidity and handling characteristics achieved by the addition of one or more central stiffening or thickening layers 112. The particle also includes reflector layers 114a and 114b that form part of the optical stacks 116a and 116b, which include spacer and absorber layers (not individually shown). The stiffening layer can be made from a wide variety of different materials including metals, alloys, dielectrics, and semiconductors.

Stiffer particles are desirable because they better survive higher-shear processes used in spray painting and because their stiffness allows for easier size-reduction processes (i.e. milling or grinding), while maintaining the flatness of the particle. Maintaining flatness is desirable so that the aggregate effect of the particles applied to a surface is similar to the optical characteristics of a foil with a similar optical thin film stack applied to the surface. The stiffening layer typically has a thickness in the range of 10 nm to 10 $\mu$m, preferably between 200 nm and 2 $\mu$m, which can improve handling, such as sizing and dispersing, in addition to stiffening the particles. The reflector layers 114a and 114b can be of the same types as reflector layers 12 and 22 described above. Similarly, it should be appreciated that optical stacks 116a and 116b can be of the same types as optical stacks described above in relation to FIGS. 1A and 2A, and can be symmetrical or non-symmetrical.

Figure 2D:
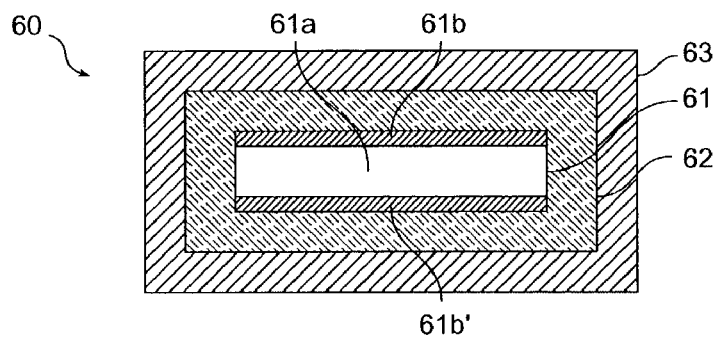
FIG. 2D is a simplified cross section of a pigment flake according to another embodiment of the present invention.

FIG. 2D is a simplified cross section of a pigment flake 60 according to another embodiment of the present invention. The pigment flake 60 has a central pre-flake 61. The pre-flake 61 has a central layer or core 61a formed of a reflective material onto which are disposed layers of transparent material 61b, 61b' having a sufficiently high stiffness to reinforce the reflecting layer and make the pre-flake 61 substantially rigid. The core 61 is aluminum about 30 nm thick, which is generally opaque, but could be other materials or thicknesses. The transparent layers 61b, 61b' are $SiO_x$, (where x is less than 2.0) about 10–50 nm thick, but could be other materials. These silicon oxide layers are transparent and provide stiffness in conjunction with the aluminum reflective layer.

A dielectric layer 62 is then coated on the preflake 61, followed by deposition of an absorber layer 63. The dielectric and absorber layers are coated on all sides of the preflake, including its ends. The thickness and material of the dielectric layer 62 is selected taking into account the optical thickness of transparent layers 61b and 61b' to provide low chroma.

Figure 2E:
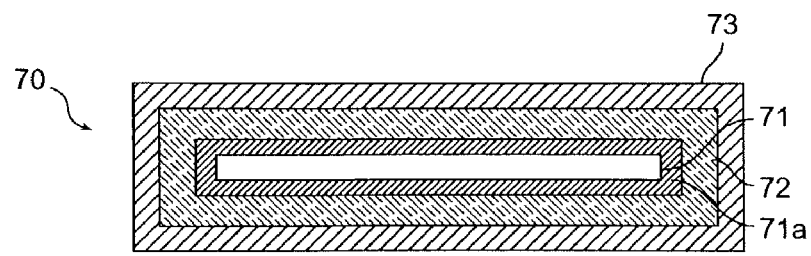
FIG. 2E is a simplified cross section of a pigment flake according to another embodiment of the present invention.

FIG. 2E is a simplified cross section of a pigment flake 70 according to another embodiment of the present invention. The dielectric layer 72 is less than about 250 nm in thickness. A reflective layer 71a is deposited on a stiff flake 71, which may be desirable in combination with the relatively thin dielectric layer to provide a stiff pigment particle. Rather than incorporating a central vacuum-deposited stiffening layer or forming a multi-layer pre-flake by a vacuum deposition method (and subsequent stripping and grinding to produce appropriately sized flakes) the thin film layers are deposited in sequence on a relatively flat and substantially rigid particle, such as glass, mica, alumina, iron oxide, graphite, bismuth oxychloride, boron nitride, polymer or metal or similar particle. By coating a relatively flat flake 71 with a reflective layer 71a, one creates a pre-formed platelet-like flake suitable for further coating, similar to the preflake 61 discussed in accordance with FIG. 6. In this case, the reflective layer surrounds the stiff flake. Examples of methods for coating such relatively flat and substantially rigid particles are chemical vapor deposition (CVD), physical vapor deposition (PVD), including sputtering, and electroplating. A spacer layer 72 is deposited to surround the reflective layer 71a, and an absorber layer 73 is deposited to surround the spacer layer.

Figure 3A:
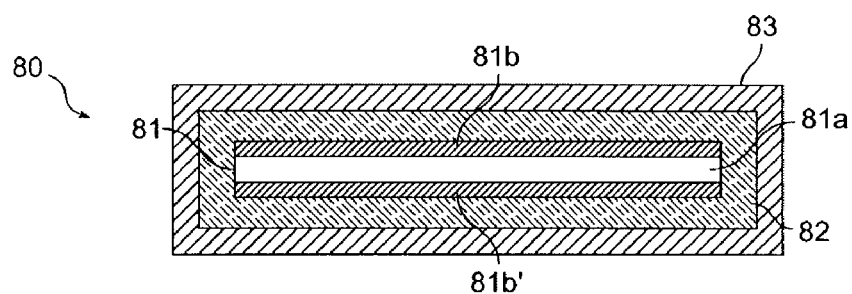
FIG. 3A is a simplified cross section diagram of a multi-layer interference structure with a center thickening layer according to an embodiment of the present invention.

FIG. 3A is a simplified cross section of a pigment flake 80 according to another embodiment of the present invention. The relative thicknesses of the layers are not shown to scale. A reflective preflake 81 includes reflective layers 81b, 81b', separated by a rigid layer 81a. The reflector layers 81b, 81b' are typically opaque or nearly opaque; therefore, the optical properties of the rigid layer are not important. The material and thickness of the rigid layer are selected according to the overall thickness and mechanical properties of the other thin film materials in the multi-layer pigment, which include a spacer layer 82 and an absorber layer 83. The rigid layer could be made of metal, dielectric material, semiconductor material, or organic material.

The thickness of the rigid layer is typically between about 10 nm to 10 $\mu$m, more preferably from about 100 nm to about 2.0 $\mu$m and most preferably from about 200 nm to about 500 nm, depending on the material of the rigid layer and the intended deposited layers.

In a particular embodiment, the rigid layer 81a is a layer of silicon monoxide (SiO or $SiO_x$ where x<2) about 250 nm thick covered on both sides with reflector layers 81b, 81b', of opaque iridium. Increasing the total thickness of the thin film structure in this manner aids in stripping the materials off a plastic web substrate, such as is used in roll-coating techniques, to form preflakes or platelets for pigments according to embodiments of the invention. Additionally, thicker pigment particles were found to be easier to sort (size) and handle compared to optically equivalent, yet physically thinner designs.

When such a multilayer thin film interference coating is stripped from a supporting substrate or web, the flakes or platelets typically range in size (distance across the face) from 2–200 μm. The platelets can be further reduced in size as desired. For example, the flakes can be subjected to an air grind to reduce their size to a size ranging typically from about 2–50 micrometers without adversely affecting their optical characteristics. The flakes or platelets are produced to have an aspect ratio of at least 2:1 and preferably about 5:1 to about 15:1, with a narrow particle size distribution. The aspect ratio is ascertained by taking the ratio of the largest dimension of a surface of the flake parallel to the planes of the layers forming the thin film to the thickness dimension of the platelet.

Figure 3B:
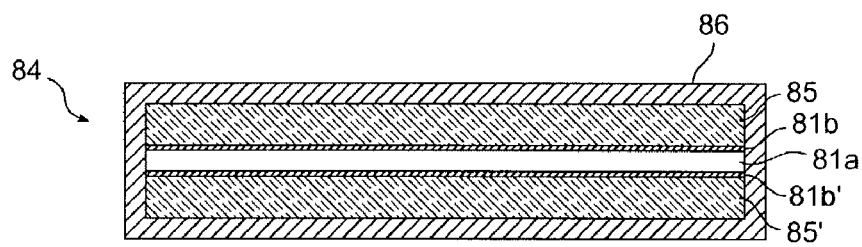
FIG. 3B is a simplified cross section of a pigment particle according to another embodiment of the present invention.

FIG. 3B is a simplified cross section of a pigment particle 84 according to another embodiment of the present invention. In this case the preflake includes a rigid layer 81a, reflector layers 81b, 81b', and spacer layers 85, 85'. The thin film layers can be roll-coated onto a film and then removed and processed into platelets of desired size, as discussed in conjunction with FIG. 3A, above. The absorber layer 86 surrounds the preflake.

Figure 3C:
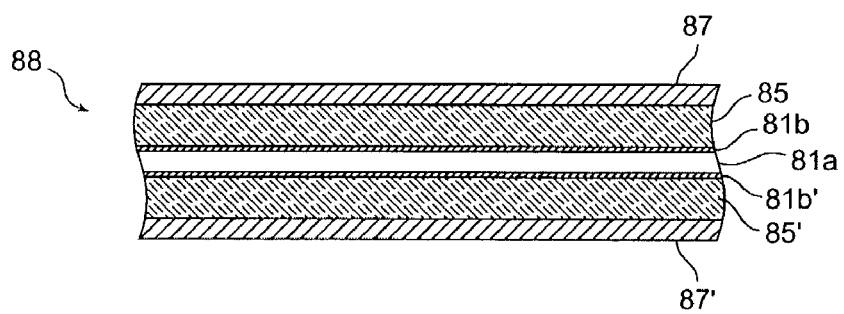
FIG. 3C is a simplified cross section of a portion of a pigment particle according to another embodiment of the present invention.

FIG. 3C is a simplified cross section of a pigment particle 88 according to another embodiment of the present invention. A rigid layer 81a, reflective layers 81b, 81b', spacer layers 85, 85' and absorber layers 87, 87' have all been formed on film and then removed and processed into platelets of desired size. The rigid layer is sufficiently thick to provide the desired handling characteristics.

In order to impart additional durability to interference pigment flakes according to embodiments of the present invention, it is sometimes desirable to anneal or heat treat the platelets at a temperature ranging from about 200° C. to about 300° C., preferably from about 250° C. to about 275° C., for a period of time ranging from 10 minutes to 24 hours, preferably about 15–30 minutes in air or an inert atmosphere, such as $N_2$ or Ar.

It should be appreciated that although FIGS. 2A, 2B, and 2E show structures in which each layer completely surrounds the layer underneath, devices with essentially equivalent performance can be achieved with layers that do not surround those layers underneath, such as shown in FIGS. 2C, 2D, and 3A–3C. Similarly, while optical stacks according to the invention have been illustrated with single spacer-absorber layers, multiple spacer-absorber layer pairs could be used. In some embodiments, a functional layer may be made up of more than one material. For example, a thin, non-opaque highly reflective layer might be formed on a less-reflective particle, or the spacer layer might be made up of multiple layers of dielectric material, as discussed above in conjunction with FIG. 6A.

The pigment flakes described in accordance with FIGS. 1A, 2A–2E, and 3A–3C can also be manufactured using a PVD process to deposit the layers. A collection of flakes can be produced by forming a symmetrical multi-layer thin film structure on a flexible web of material and separating the thin film structure from the web to provide a collection of platelets. While some pigment flakes made according to embodiments of the present invention using roll coating techniques, particularly relatively thin flakes, perform well optically, they can be difficult to strip from the plastic web and to process down to size desirable for use in paints and inks without a stiffening layer. Other embodiments are easily stripped from the plastic web. In some applications, the desired particle size is about 20 μm. In other applications, it may be desirable to use particles in the range of about 5 microns to about 100 microns across.

Although highly reflective particles according to some embodiments of the present invention can have low chroma, it is generally desirable that optical stacks according to the present invention have an average reflectance less than about 50% in the visible spectrum. Chroma ($C^*_{ab}$) is generally the degree of perceived color of an object compared to a gray object having the same lightness ($L^*$) and is further defined according to the CIE 1976 $L^*a^*b^*$ color system by the formula $C^*_{ab}=(a^{*2}+b^{*2})^{0.5}$. Even objects with low average reflectivity can at the same time have a non-uniform reflectivity imparting color, i.e. chroma, to the object. Thus it is further desirable that the chroma of an optical stack, or pigment particles or foils incorporating optical stacks according to embodiments of the present invention have a chroma less than about 20. Other embodiments, such as foils, surfaces, or pigment particles that appear black, may have higher chroma because the lightness is so low, typically less than about 5. In these embodiments chroma may be as high as 50 without imparting significant perceived color.

II. An Optical Thin Film Structure with a Black Appearance

In a multilayer interference structure of an embodiment, performance factors such as infrared emittance, solar absorbance, and visible color values are determined by the choice of number of layers, the materials and their thicknesses. When a black visible appearance is desired, the absorber thickness is chosen in combination with the reflector according to the absorber material to reduce the reflectance of the optical stack in the visible spectrum. For example, if the reflector layer is aluminum, a preferred absorber has a visible transmittance of about 50%, which is considered moderate transmittance, to reduce the average resulting visible reflectance of the optical stack to less than about 20%. In contrast, if the reflector is chromium, tantalum, or another material having a lower reflectivity than aluminum, the absorber layer transmittance may be increased in correspondence to the lower visible reflectivity of the reflector layer.

FIG. 2B represents one type of pigment flake configuration that could be used for embodiments of the present invention. This type of flake is symmetrical, in other words, the coating layers are essentially the same on all sides. Such symmetry is not required. For example, flakes might have symmetry only with regards to the layers on the major surfaces, or might have different thin film layers on different surfaces.

In one embodiment, a pigment flake in accordance with FIG. 2B has a central reflector layer of aluminum about 100 nm thick, a dielectric layer of $MgF_2$ having a thickness of about 1.0 QWOT @480 nm to provide minimum reflectance in the visible region, and an absorber layer of chromium with a thickness of about 6 nm to provide about 50% transmission through the as-deposited chromium layer.

The absorber thickness is chosen to give the minimum reflectance over the visible spectrum, with the minimum reflectance centered around 510 nm. The design appears black to the human eye, with an anticipated lightness (L*) of about 6 and a chroma ($C_{ab}^*$) of about 50.

Figure 4A:
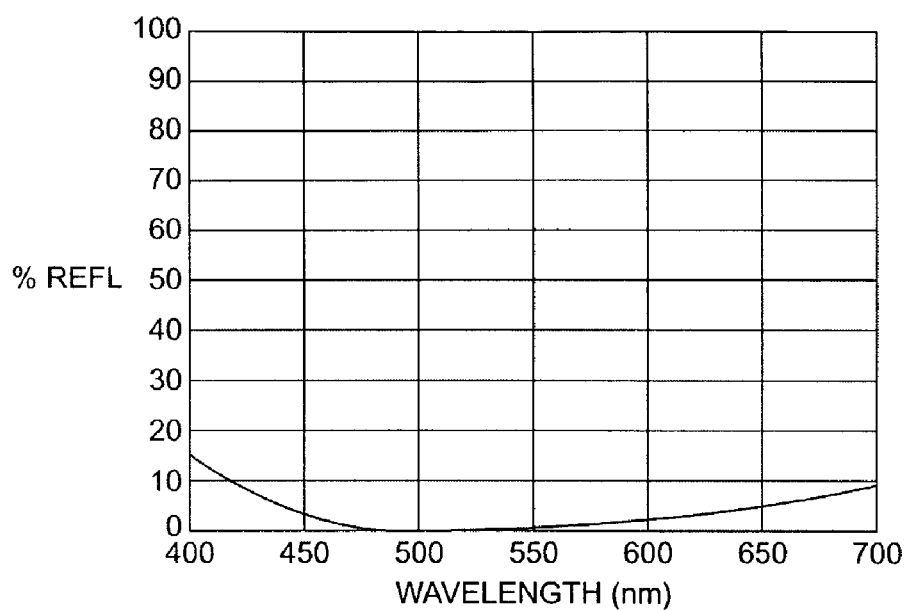
FIGS. 4A and 4B are graphs of the predicted reflectance versus wavelength for an embodiment of the present invention.

A flake-like pigment according to such a design is preferably mixed into a low emittance polymer binder and applied like paint, turning surfaces into a high efficiency solar absorber. FIG. 4A illustrates the predicted visible performance of the device described above, while FIG. 4B shows the predicted performance of the same design over the visible and infrared wavelengths.

When used as a pigment, this design has several possible advantages over traditional absorptive black pigments. For example, decorative black paints according to embodiments of the present invention can achieve a black metallic ("sparkly") effect. It is believed that the sides of the flakes provide relatively strong localized reflection in the visible region, thus providing the sparkle. Alternatively the black pigment flakes could be mixed with bright (reflective) flakes in a clear carrier (paint base) to provide a gray sparkle finish. In conventional paint systems, a black color is typically obtained by mixing fine carbon black or similar pigment into the paint, which dulls reflectivity occurring from reflective flakes.

One can achieve dark colors by changing the dielectric thickness of the interference design. Increasing the dielectric thickness gives colors of indigo and dark blue; decreasing the thickness gives dark brown. The wavelength of minimum reflectance decreases (toward blue/UV to values in the range of 200–510 nm) with decreasing dielectric thickness and increases (toward red/IR to values in the range of 510–1500 nm) with increasing dielectric thickness.

The design's reflectance is higher in the infrared than in the visible portion of the spectrum, thus able to provide a covert feature in a security device. When placed in outer space or in outdoor locations, the design provides simultaneous high absorption of solar wavelengths (0.2–2.5 µm) and low emittance of thermal wavelengths (4–40 µm) making it an excellent solar absorber.

Figure 4B:
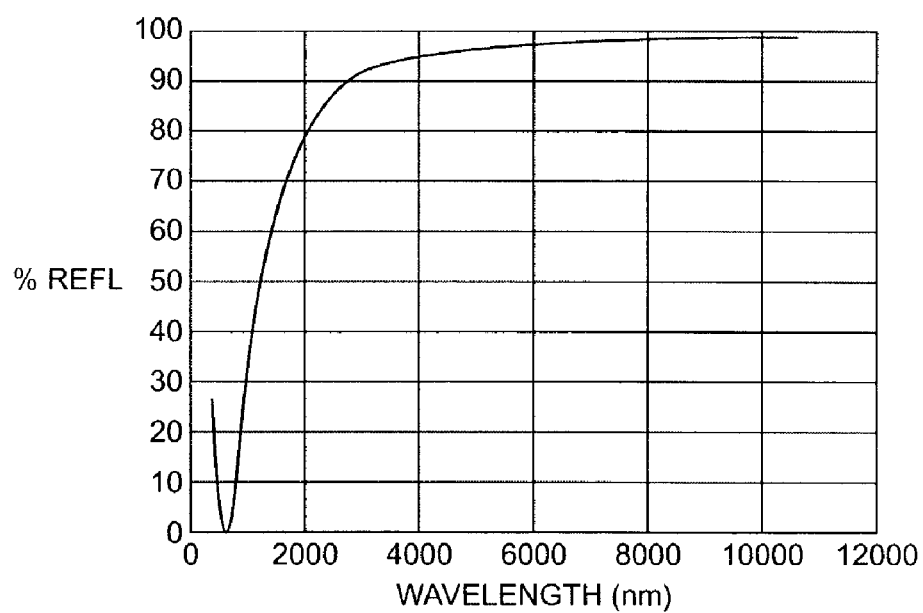

An optical design as described above for the pigment flake discussed in conjunction with FIGS. 4A and 4B can be adapted for deposition onto a foil. The foil can be laminated, glued, or otherwise applied to another object, such as a solar absorber module, to provide that object with enhanced optical absorption and thermal retention.

III. An Optical Thin Film Structure with a Gray Appearance

When a gray appearance is to be coupled with a moderate infrared emittance (moderate infrared reflectance), the transmittance of the absorber is chosen to be lower than for the black case. For example, when the reflector is aluminum, a preferred absorber has a visible transmittance of about 15% to about 50% depending on the desired lightness, while the visible transmittance can be as low as 5% and still function in this manner. So now we have a desired absorber thickness providing between 15–85% transmittance for a reflector with not less than 80% reflectance, depending upon the degree of infrared emittance that is desired. This selection allows one to create optical stacks with similar visual characteristics, yet different IR characteristics.

In another embodiment of the present invention, a pigment flake in accordance with FIG. 2B has a central reflector layer of aluminum about 80 nm thick, a dielectric layer of $MgF_2$ with an optical thickness of about 1.0 QWOT @ 500 nm, and an absorber layer of chromium with a physical thickness of about 20 nm. In this design, the absorber and dielectric thicknesses are chosen to give a medium level of lightness (L*), with nominally uniform reflectance over a range of wavelengths, or in other words, a gray visible appearance. This embodiment provides a high level of reflectance in the infrared. Devices of this type are useful in several applications. For example, if some but not all of the sun's energy is to be absorbed and retained. Another example is when both visible and IR camouflage is desired for objects in the sky or on the sea. A gray color is useful for the visible camouflage, while the high IR reflectance prevents high emission of thermal energy that could be observed by IR detectors.

This embodiment can provide advantages for military applications, where night vision type thermal imaging scanners are used to detect articles or objects warmer than their surroundings. An article coated with either a foil or pigment-containing coating according to embodiments of the present invention will emit less thermal infrared energy than its uncoated counterparts, rendering it less distinguishable from surrounding objects at night, as well as providing visible coloration compatible with daytime camouflage. Articles painted with traditional gray paints pigmented with mixtures of carbon black and white $TiO_2$, generally do not have significantly suppressed IR emissions.

In general, simultaneous visual and IR camouflage of objects from human and artificial surveillance and tracking devices can be obtained with an opaque exterior coating having a low luminous reflectance, low solar absorption, and low infrared emittance. In other embodiments, a dark or moderately dark exterior coating having a low luminous reflectance and high infrared reflectance is desired. The exterior may serve as visual camouflage, either as a solid color or as patterned colors.

Figure 5A:
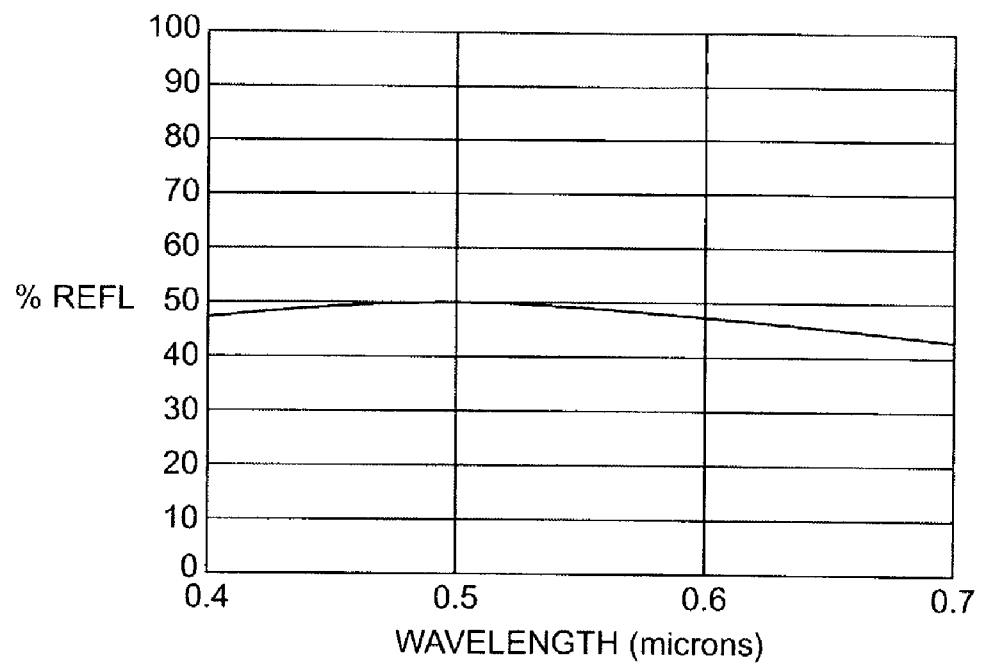
FIGS. 5A and 5B are graphs of the measured reflectance versus wavelength for an embodiment of the present invention.
Figure 5B:
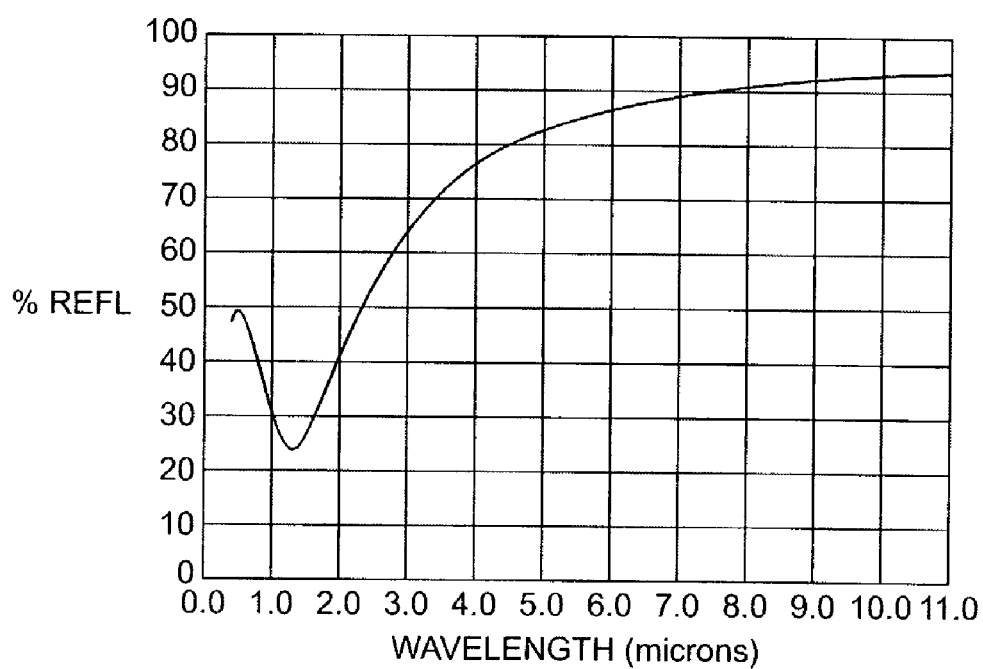

FIGS. 5A and 5B are graphs illustrating the measured reflectivity versus wavelength for an optical stack in accordance with the example of the gray optical structure discussed above. The reflectance of the device reaches a minimum value around 1.3 µm in the near infrared and then increases in the mid and far-infrared regions. The dielectric thickness can vary from a low value such as 1.0 QWOT @200 mm to a higher value such as 1.0 QWOT @ 800 nm while still providing a nominally gray appearance.

Varying the thickness of the absorber layer can modify the reflectance profile. When the absorber thickness is decreased from the thickness of the absorber layer that provides the minimum reflectance ($tabs_{min}$, which is about 50% transmittance for an aluminum reflector), the pigment appears gray, rather than black. For example, with an optical stack having a minimum reflectance at 510 mm, decreasing the absorber thickness increases the transmittance through the absorber layer, resulting in a progressive change in appearance from black to dark gray to medium gray to light gray and finally to silver, at about 85% transmittance through the absorber layer. Thus, the lightness value, L*, is selectable based on the absorber thickness going from a value near zero when $ta=tabs_{min}$, increasing steadily to the value of the bare reflector as ta approaches zero. All this while the mid- and far-IR reflectance remains high. The choice of the reflector can determine the final color or shade of gray. Foils or pigments with highly reflecting (>80%) metal as the reflector layer, such as aluminum or silver, approach their native appearance, i.e. a silver color, with very thin absorber layers. The use of metals or other materials with lower reflectivity, such as iron, silicon or tantalum, as the reflector layer limits the color to grays, even with very thin absorber layers.

When the absorber thickness is increased from the thickness of the absorber layer that provides the minimum reflectance, the pigment also appears grayish. However, as the absorber transmittance is decreased from about 50% to 0% (increasing absorber thickness) the optical stack progressively ceases to act as an interference structure. The appearance of the optical stack approaches that of the absorber layer, changing from black through dark gray to medium gray, as the absorber layer becomes substantially opaque. As the transmittance of the absorber layer decreases from about 50% to 0%, the infrared emittance is also affected and progressively approaches that of the opaque absorber material. Devices in this range are very useful when it is desirable to have both a moderate level of solar absorbance along with a moderate level of emittance.

IV. Low-Color Optical Thin-Film Structures

When a neutral appearance is desired such as in the gray and black examples above, the optical design of layer construction, materials, and thicknesses is chosen to minimize the absolute chroma. There are other optical designs that provide low color purity and chroma but have some perceived color. For example, the optical design that gives the maximum solar absorbance is not always the design that provides a black appearance. In other cases, a pigment or foil with a slightly, typically dull, colored appearance might be desired for aesthetic reasons. Some of these dull colors are variants of gray such as gray-green, gray-blue, and steel gray. The low-chroma blue design, for example, is suitable for applications where it is desirable to avoid visible detection. Other colors can be considered variants of black such as dark brown, dark blue, deep burgundy, dark green, and indigo. These colors can be obtained using variations of the asymmetrical and symmetrical embodiments above and at the same time provide the desired levels of solar absorbance and infrared emittance.

Typically, to obtain thermal control structures with a dull but colored appearance, the dielectric (spacer) thickness is increased or decreased from that which gives neutrality (i.e. no perceptible color). Starting from a neutral black, as the dielectric thickness increases, the color typically changes from black to indigo to dull blue to dull green. As the dielectric thickness decreases, the color usually moves from black to dark brown.

The dielectric or spacer layer for colored low-chroma optical stacks preferably comprises materials having indices of refraction in the range from about 1.2 up to 4.5 and preferably has an optical thickness of between about 1 QWOT at 200 nm and 2 QWOT at 700 nm, and more preferably about 1 QWOT at 300 nm to about 2 QWOT at 500 nm. The refractive index of the dielectric layers is more preferably greater than 1.65, most preferably greater than about 2.0. Selection of a high refractive dielectric material is one way to minimize the variation in interference color with angle incidence, that is, a shift in observed color as the observer changes his position with respect to the coated object, or views a plane or portion of the objected disposed at a non-parallel orientation with respect to other portions of the object or article (assuming a fixed light source). In comparison, optical stacks used in applications where color shifting is desirable typically use spacer layers made of materials with a refractive index less than 1.65, and more preferably less than about 1.5.

The color shifting tendencies of optical stacks according to embodiments of the present invention can also be reduced by reducing the thickness of a low-index dielectric layer. This reduces the interference color and chroma as well as the color shift in visible wavelengths. As the dielectric layers serve to make the flake mechanically rigid, when the dielectric layers are reduced in thickness, it is may be preferable to increase the thickness and/or rigidity of the reflective layer or to provide a stiffening layer.

In another embodiment of the invention, a pigment flake in accordance with FIG. 2B has a central reflector layer 22 of aluminum about 40 nm thick and a dielectric layer 33 about 1.0 QWOT at 300 nm to about 2.0 QWOT at 550 nm in optical communication with the reflector layer. The absorber layer 34 has a thickness sufficient to reduce the internal transmission of the absorber layer to about 50% across the visible spectrum. The overall average reflectivity of the pigment flake is less than about 50% over the visible spectrum.

The visible appearance of the pigment and resultant coatings can be progressively modified from dark brown to black to indigo to a dull blue to a dull green by adjusting the thickness of the dielectric layer 33. For example, when a dull blue color with low chroma is desired, the dielectric layer thickness is in the range of about 2.0 QWOT @ 280 nm to 2.0 QWOT @ 450 nm. Alternatively, a device having a dull green color with low chroma results when the dielectric layer thickness increases to a range of about 2 QWOT @ 450 nm to 2 QWOT @550 nm. When using a low-index dielectric, increasing the dielectric thickness to greater than about 2 QWOT @700 nm results in unstable chroma. Unstable chroma is a condition where the perceived color depends on the angle of incident light. For blue and green devices, the reflectance of the device reaches a local minimum value in the near infrared, and then increases in the mid- and far-infrared regions. By providing generally low reflectance in the visible and near IR regions, while at the same time achieving high reflectance in the mid- and far-IR regions, this embodiment performs as a good solar absorber.

Figure 6A:
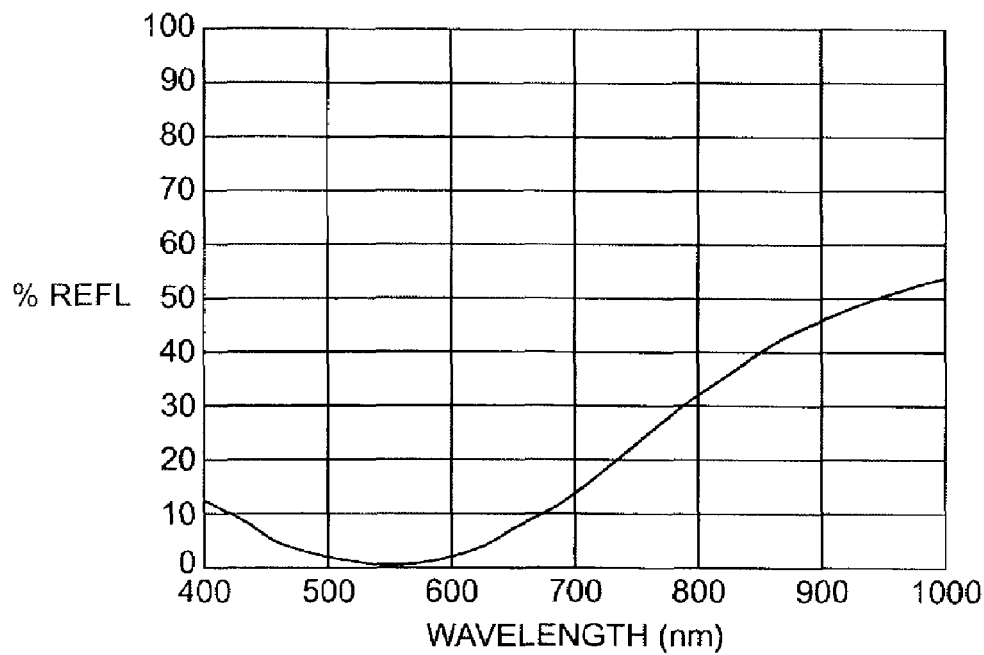
FIGS. 6A and 6B are graphs of the predicted reflectance versus wavelength for another embodiment of the present invention.
Figure 6B:
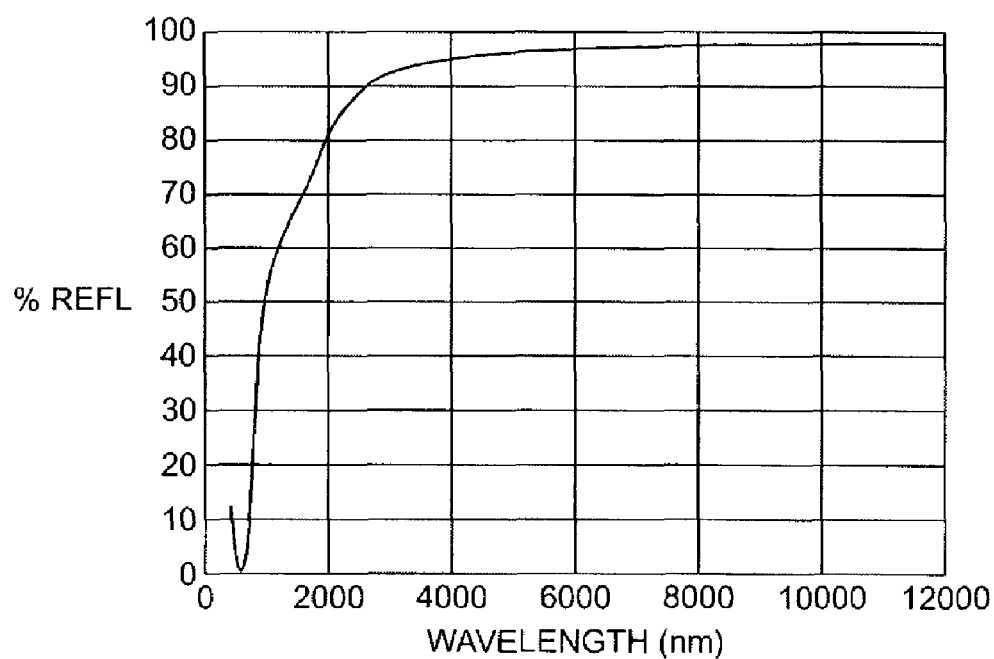

FIGS. 6A and 6B illustrate the calculated performance of another embodiment of the present invention. Optical designs according to this embodiment can incorporated into both foils and pigments, such as a thermal control flake with a structure of A/D/R/D/A. The approximate layer materials and thicknesses for this example device are as follows:

R=80 nm aluminum

D=1.0 QWOT ZnS @ 200 nm

A=27 nm carbon.

For this example, the absorber thickness is chosen to provide about 45% internal transmittance (i.e. transmittance in/through the absorber layer) in the visible region. The design provides a dark (low lightness) burgundy color appearance and a high infrared reflectance. The dielectric ZnS has a high refractive index, so the reflectance in the mid infrared region is generally higher than designs utilizing lower index dielectrics, which is an advantage for applications requiring better performance in this region. At the same time, the reflectance minimum in the solar region is not as broad as the design described in association with the black optical design. When utilized as a foil, the design can be simplified to S/R/D/A, where S is an optional substrate.

Figure 7A:
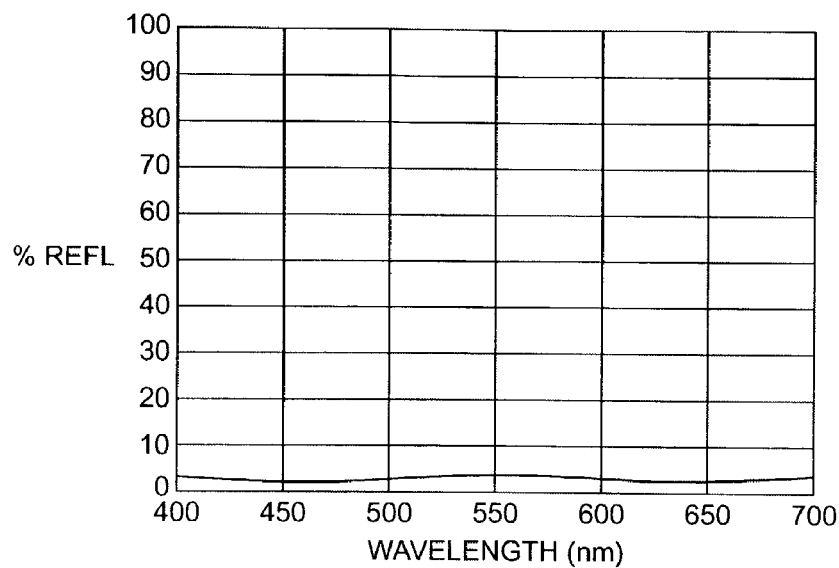
FIGS. 7A and 7B are graphs of the predicted reflectance versus wavelength for another embodiment of the present invention.
Figure 7B:
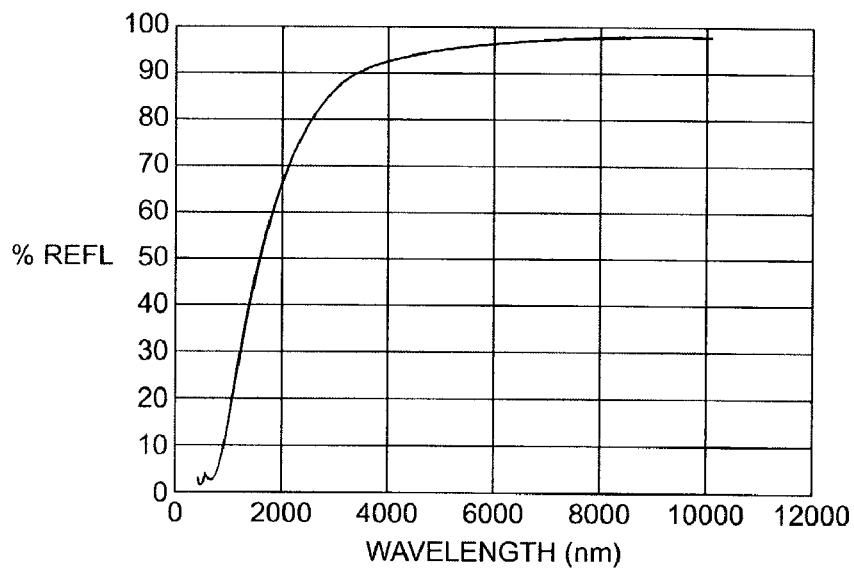

FIGS. 7A and 7B are graphical illustrations of the calculated (modeled) optical performance of a multi-layer interference structure according to an embodiment of the present invention over visible wavelengths and infrared wavelengths. The multi-layer interference structure can be incorporated into both foils and pigments. Rather than utilizing one dielectric-absorber pair, the optical stack has two dielectric-absorber pairs. In a further embodiment, a pigment flake with layer order: $A_2/D_2/A_1/D_1/R/D_1/A_1/D_2/A_2$ is used. The approximate layer materials and thicknesses for this example device are as follows:

R=80 nm aluminum
$D_1=D_2=1.0$ QWOT $MgF_2$ @300 nm
$A_1=7$ nm chromium
$A_2=2.5$ nm chromium The device achieves a uniform low reflectance across the visible spectrum but achieves a high reflectance level (low emittance) in the far infrared. Instead of two dielectric-absorber pairs, three and four pairs can be used; however, this increases cost and complexity. When utilized as a foil, the design can be simplified to $S/R/D_1/A_1/D_2/A_2$ where S is an optional substrate. In some embodiments, the reflector is substantially thicker than necessary to provide the desired reflectance, and serves as a substrate to deposit the other layers on, such as aluminum foil or stainless steel foil.

V. Forms and Applications of Embodiments of the Invention

Optical thin film structures according to embodiments can be formed on pigment particles, films, foils, and other objects. For example, a optical thin film structure might be deposited directly on a piece of glass, metal, plastic, ceramic, or composite material, or on a film or foil that is applied to a piece of wood, fabric, plastic, glass, metal, ceramic, or composite material.

Figure 8A:
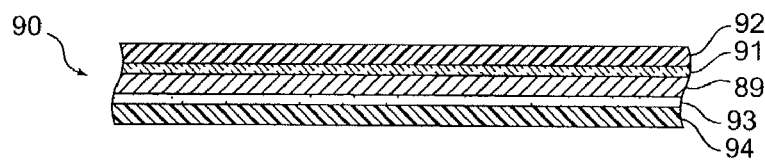
FIGS. 8A–8C are simplified cross sections of films and foils according to embodiments of the present invention.

FIG. 8A is a simplified cross section of a portion of a film or foil 90 according to an embodiment of the present invention. An optical thin film structure 91 according to an embodiment of the present invention is deposited on a substrate 89, such as a polymer film, e.g. a film of polyethylene terephthalate ("PET") or a metal foil, such as aluminum or stainless steel foil. An optional top coating 92 is applied over the optical thin film structure to provide protection from the environment, or to enhance the optical properties of the film or foil. In an alternative embodiment, a polymer cover sheet is attached to the top of the optical thin film structure with a layer of laminating adhesive. An optional mounting adhesive layer 93 is provided on the opposite side of the substrate, and a release liner 94 is provided to facilitate handling of the assembly. The release liner is removed to expose the mounting adhesive layer so the film or foil can be conveniently applied to a surface.

Figure 8B:
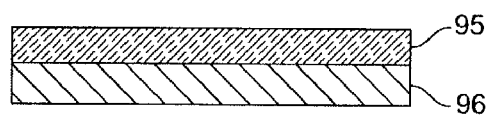

FIG. 8B is a simplified cross section of a foil 95 as-described in accordance with FIG. 8A, above, attached to a panel 96. The release liner is removed to expose the mounting adhesive, and the film is applied to the panel. Films according to embodiments of the present invention provide thermal control by having low IR emittance (high IR reflectivity) while transmitting or absorbing higher wavelength light.

Figure 8C:
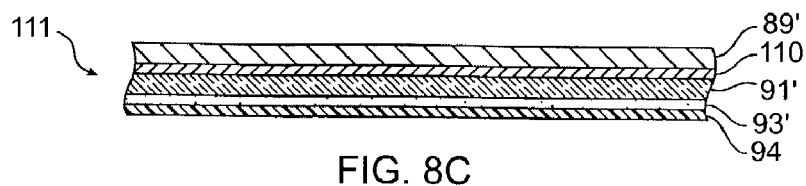

FIG. 8C is a simplified cross section of an optical thin film transfer foil 111 for application to a surface. The optical thin film stack 91' may be deposited "backwards" onto the substrate 89', such as a plastic film. In other words, the absorber is deposited first, then the spacer layer, and finally the reflector. An optional adhesive layer 93' and release liner 94 may be included for attaching the transfer foil to a surface, or the surface may be coated with the adhesive before attaching the foil. An optional release layer 110 may be included between the substrate and the thin film layer to facilitate removal of the substrate from the transfer foil after it has been attached to the surface. An optional overcoat layer (not shown) may be applied between the optical thin film stack and the release layer before applying the transfer foil to the surface, or may be applied after the transfer foil has been attached to the surface.

Pigment flakes according to embodiments of the present invention can be incorporated into any number of liquid or solid media and used as ink, paint, extruded plastic film, plastic part, or powder coatings, for example. The optical designs have advantages where a low chroma and/or relatively neutral color effect is desired along with low infrared emittance. The dielectric and absorber thicknesses of the design are chosen to meet the desired color, lightness, reflectance, solar absorptance, and infrared emittance properties. Embodiments of the present invention allow one to design a foil, pigment, or other structure incorporating an optical stack to give a wide range of solar absorptance, infrared emittance, lightness, and color values. Designs with thin absorbers, i.e. with absorber layers that are thinner than the absorber thickness that would provide the minimum reflectance in the visible spectrum, will have higher mid-infrared reflectance than will designs with thicker absorbers. The optical design of the pigment flakes may be optimized according to the type of carrier or vehicle ("matrix") the pigment flakes will be dispersed in. In some instances, the matrix has a relatively low refractive index, and optical designs derived for air can be used in the carrier with little degradation of the optical performance of the pigment dispersed in the matrix.

Figure 9A:
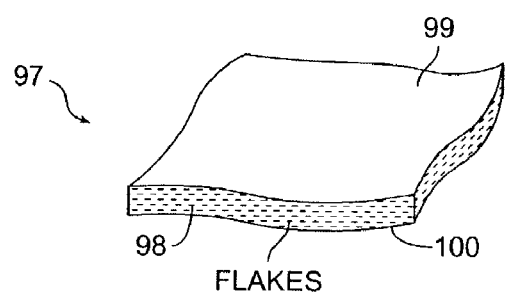
FIGS. 9A and 9B are simplified cross sections of polymeric sheets according to embodiments of the present invention.

FIG. 9A is a simplified cross section of a polymeric sheet 97 with pigment flakes 98 according to an embodiment of the present invention. Such a polymeric sheet can be formed by casting or by extrusion. The film forming the sheet should have a thickness of at least two times the thickness of the multi-layer interference thin film flakes, which typically have a thickness of approximately 0.5 micrometer, so that the sheet should have a thickness of about 1 $\mu$m or more.

In general, the polymeric sheet comprises a layer of polymer material having first and second parallel surfaces 99, 100. A plurality of pigments flakes according to an embodiment of the present invention are disposed within the layer of polymeric material. The flakes generally have an aspect ratio not less than about 2:1 and first and second parallel surfaces that generally align themselves to the first and second parallel surfaces of the polymeric sheet so that the aggregate effect of the particles is similar to the effect that might be obtained by a foil or film as described above in relation to FIG. 8A. Alignment of the flakes can be achieved during extrusion or casting, or by stretching the polymer sheet, for example. An adhesive layer and release liner may be further added to one or both sides of the polymeric sheet. Similarly, the sheet may be laminated to additional polymeric sheets or other objects. Alternatively, a multiple layer polymeric sheet can be formed by co-extruding films in which the outermost, and preferably thinner layer, comprises the pigments of the instant invention.

Figure 9B:
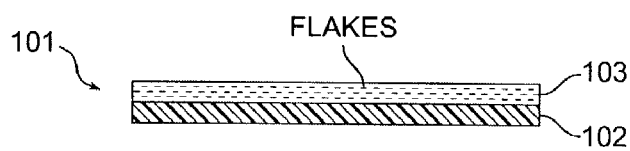

FIG. 9B is a simplified cross section of a co-extruded polymer sheet 101 with pigment flakes according to another embodiment of the present invention. The a first film layer 102 in such a co-extruded film may provide structural support or protection to the film layer 103 containing the pigment flakes, serve as an adhesion or bonding layer to the article or housing requiring thermal control or serve as the structural housing itself. In other embodiments, a central film layer may be extruded with pigment-containing layers on either side, or a pigment containing layer may be sandwiched between two film layers, such as clear or dyed PET.

In connection with the present invention, various types of polymers can be used. For example, with an aqueous polymer, a polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate and poly(sacchrides) such as gum arabic and pectin may be used. If an organic solvent base is to be utilized, almost any polymer system that is dissolvable may be used. This may include those polymers listed in the aqueous examples above but will also include the additional polymers of poly(acetals), such as polyvinylbutyral, poly(vinyl halides), such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephthalate, poly (urethanes), poly(siloxanes), poly(suphides), poly(sulphones), poly(vinylnitriles), poly(acrylonitriles), poly (styrene), poly(phenylenes) such as poly(2,5 dihydroxy-1, 4-phenyleneethylene), poly(amides), natural rubbers, formaldahyde resins and other polymers.

Figure 10:
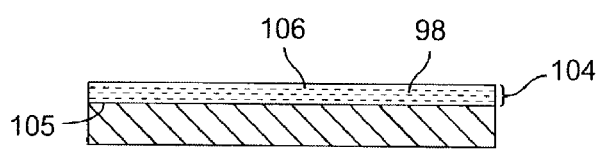
FIG. 10 is a simplified cross section of a paint layer applied to a surface according to an embodiment of the present invention.

FIG. 10 is a simplified cross section of a layer of paint 104 containing pigment flakes 98 according to an embodiment of the present invention applied to a surface 105. The paint includes a paint vehicle 106 that is fluid when the paint is applied. As the paint dries or hardens, the pigment flakes generally align themselves with the surface. Thus, the aggregate effect of the pigment particles is similar to the surface being covered with a foil or film, or being directly coated with the thin film layers having a similar optical thin film structure. In a particular embodiment, the paint matrix is a polymer with a low infrared emittance, such as a silicon-based paint. In a particular embodiment, it is desirable that the vehicle or matrix of the pigment flakes has an IR emittance less than about 0.5.

The current invention offers the advantages listed in the previous section in that one can provide a portable thin film applicable as a paint, ink, plastic, or other form that has substantially lower reflectance values in the visible portion of the optical spectrum compared to the infrared portion of the spectrum. Thus, one can provide a variety of brightness and colors with low infrared emittance. The reflectance characteristics can be further selected between the near- and far-infrared regions. Paints according to embodiments of the invention may be indigo, blue, green, brown, and burgundy, as well as black and various shades of gray.

In the energy control field, this invention allows for solar control paints with high absorptance and low emittance that can be applied to a variety of surfaces and materials. In addition, it allows thermal control paints with specified absorptance/emittance ratios. Pigments made according to the teachings of the invention to have a dark or black appearance are useful in decorative, military, or solar energy markets.

Pigments made according to embodiments of the present invention are also useful in anti-counterfeiting applications. Pigments having a neutral or near neutral appearance (low chroma or very low chroma) and high IR reflectivity can be used to impart an IR image to an object. In further embodiments, neutral or low chroma ink, paint, foil, or similar material having high IR reflectivity is patterned in conjunction with similar neutral or low chroma with lower IR reflectivity. For example, an image could be printed on a bill, certificate, passport, or other article that has one image visible to the eye, and another image visible in the infrared, such as overprinting an IR image with black pigment according to the present invention in a black field printed with conventional black ink.

Figure 11:
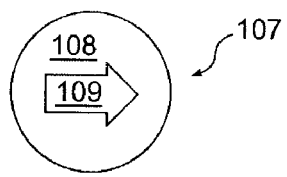
FIG. 11 is a simplified plan view of an image according to an embodiment of the present invention.

FIG. 11 is a simplified plan view of an image 107 printed with ink according to an embodiment of the present invention. The image has a first field 108 and a second field 109. For simplicity of illustrations, both fields are shown without color or shading, but would generally be black, gray, or low-color, at least for one field of the image. For example, the first field could be printed with conventional black ink, and the second field printed with black ink according to an embodiment of the present invention. The second field could have relatively high IR reflectivity and be easily viewed with an IR detector, but essentially be invisible to a human. Such techniques may be used to superimpose IR images on visual images, or to embed IR images on or in objects, such as for security or anti-counterfeiting purposes. Similarly, the entire image could be printed with ink according to the present invention, which would not be obvious by casual inspection, yet be verifiable with IR inspection techniques, and would be much more involved for the counterfeiter to make.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A particle comprising:
   a thickening layer having a first surface, a second surface, and a thickening layer thickness;
   a first optical interference structure having a first chroma not more than 20 and an infrared reflectivity greater than 50% disposed on the first surface; and
   a second optical interference structure having a second chroma less than 20 and an infrared reflectivity greater than 50% disposed on the second surface.

2. The particle of claim 1 wherein the thickening layer thickness is between 10 nm–10 microns.

3. A particle comprising:
   a thickening layer having a first surface, a second surface, and a thickening layer thickness;
   a first optical interference structure having a first chroma not more than 20 and an infrared reflectivity greater than 50% disposed on the first surface; and
   a second optical interference structure having a second chroma less than 20 and an infrared reflectivity greater than 50% disposed on the second surface, wherein the thickening layer thickness is between 100 nm–2 microns.

4. A particle comprising:
   a thickening layer having a first surface, a second surface, and a thickening layer thickness;
   a first optical interference structure having a first chroma not more than 20 and an infrared reflectivity greater than 50% disposed on the first surface; and
   a second optical interference structure having a second chroma less than 20 and an infrared reflectivity greater than 50% disposed on the second surface, wherein the thickening layer thickness is between 200–500 nm.

5. The particle of claim 1 wherein the thickening layer comprises silicon oxide.

6. The particle of claim 1 wherein the thickening layer comprises silicon oxide at least 200 nm thick, a first layer of opaque reflector disposed on the first surface, and a second layer of opaque reflector disposed on the second surface.

* * * * *